Figure 5:
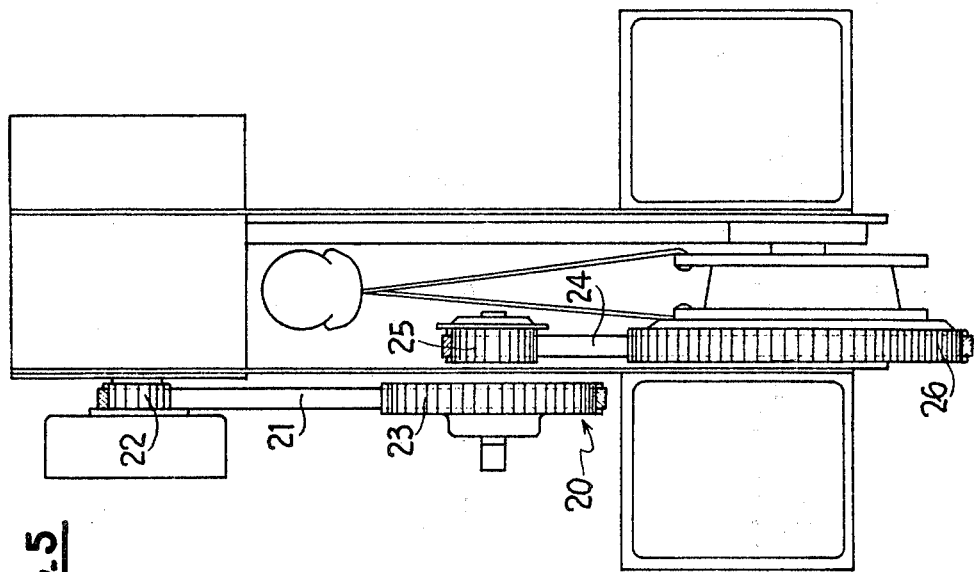

United States Patent [19]

Lacroix

[11] 4,406,342
[45] Sep. 27, 1983

[54] ELECTRICALLY PROPELLED TWO-WHEELED VEHICLE

[75] Inventor: Bernard Lacroix, Montbeliard, France

[73] Assignee: Cycles Peugeot, Valentigney, France

[21] Appl. No.: 307,265

[22] Filed: Sep. 30, 1981

[30] Foreign Application Priority Data

Oct. 15, 1980 [FR] France .................... 80 22011

[51] Int. Cl.³ .................. B62M 7/08; B62D 61/02
[52] U.S. Cl. ................... 180/220; 180/68.5; 180/221; 180/231
[58] Field of Search ............... 180/220, 221, 231, 68.5

[56] References Cited

U.S. PATENT DOCUMENTS 3,773,131 11/1973 Jaulmes ............................ 180/220
3,878,910 4/1975 Walker, Jr. ...................... 180/220
3,966,007 6/1976 Havener et al. ................. 180/220

FOREIGN PATENT DOCUMENTS 2411302 7/1979 France ............................. 180/220

*Primary Examiner*—Joseph F. Peters, Jr.
*Assistant Examiner*—Kenneth R. Rice
*Attorney, Agent, or Firm*—Sughrue, Mion, Zinn, Macpeak and Seas

[57] ABSTRACT

The vehicle comprises four compartments for receiving accumulator batteries. Two of these compartments are placed on each side of the frame of the vehicle in the median part of the latter. The other two compartments are disposed on each side of the rear wheel of the vehicle. The motor of the vehicle is preferably disposed under and at the rear of the saddle. Many advantages result from this arrangement which enables an increased production of this type of vehicle to be envisaged.

11 Claims, 5 Drawing Figures

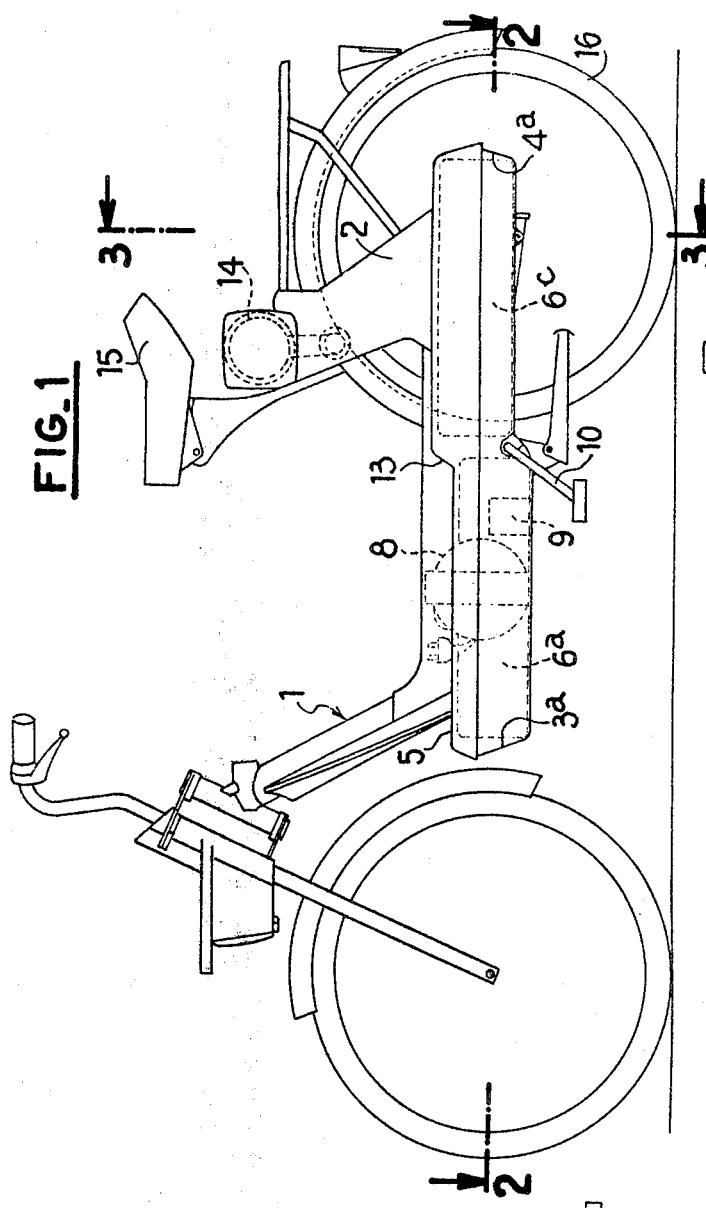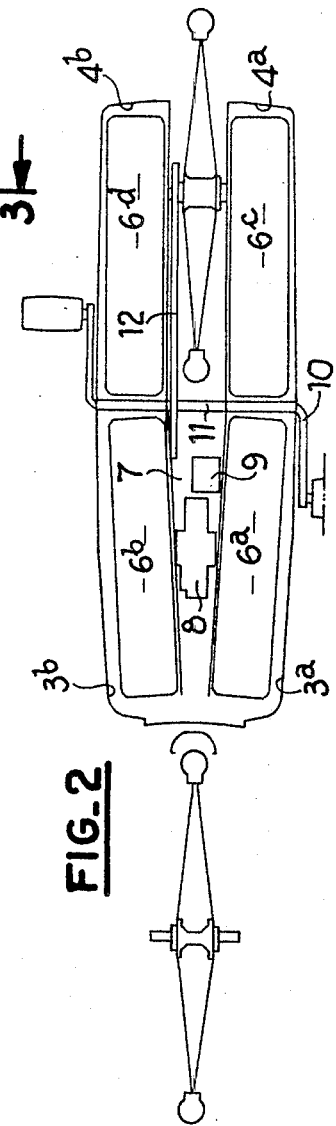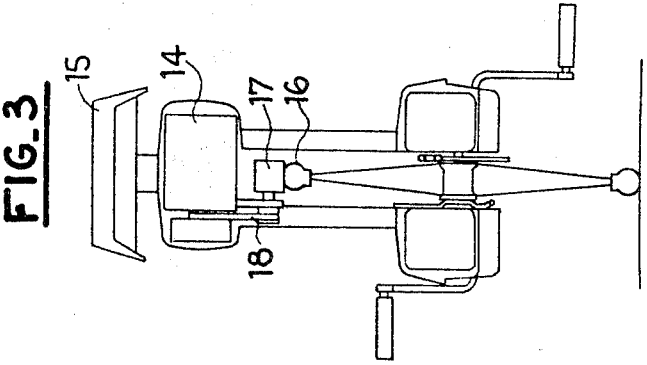

ELECTRICALLY PROPELLED TWO-WHEELED VEHICLE

DESCRIPTION

The present invention relates to electrically propelled two-wheeled vehicles.

A number of such vehicles have already been proposed which are propelled by an electric motor supplied with current from accumulator batteries carried by a cradle and disposed under the central part of the frame of the vehicle. The motor is disposed below and in front of the saddle. Such an arrangement presents serious drawbacks among which may be mentioned the following:

bearing in mind the position of the batteries, it is difficult to position the pedal crank-gear which is still essential for the purpose of propelling the vehicle in the event of breakdown or for assisting this propulsion when the vehicle is travelling on a slope;

bearing in mind the space taken up by these batteries, the feet of the user are raised or spaced apart, depending on whether they bear on a footrest placed above or on each side of the batteries;

this arrangement is moreover very disadvantageous from the aesthetic point of view and does not lend itself very well to the construction of a vehicle of attractive appearance.

An object of the invention is to overcome these various drawbacks and to provide an electrically propelled two-wheeled vehicle comprising a frame carrying electric accumulator batteries and a motor supplied with current from said batteries and transmission means between the motor and the driving wheel, wherein the batteries are disposed in the center part of the vehicle and on each side of the rear wheel of the vehicle.

According to other features:

there are provided in the center part of the vehicle two battery-subassemblies which are disposed roughly symmetrically relative to the longitudinal median plane of the vehicle and define therebetween a space in which various accessories may be placed;

the batteries have a relatively small height;

the pedal crank-gear extends in an intermediate region between the batteries disposed respectively in the center part of the vehicle and on each side of the rear wheel;

the motor is disposed below and at the rear of the saddle.

Figure 4:
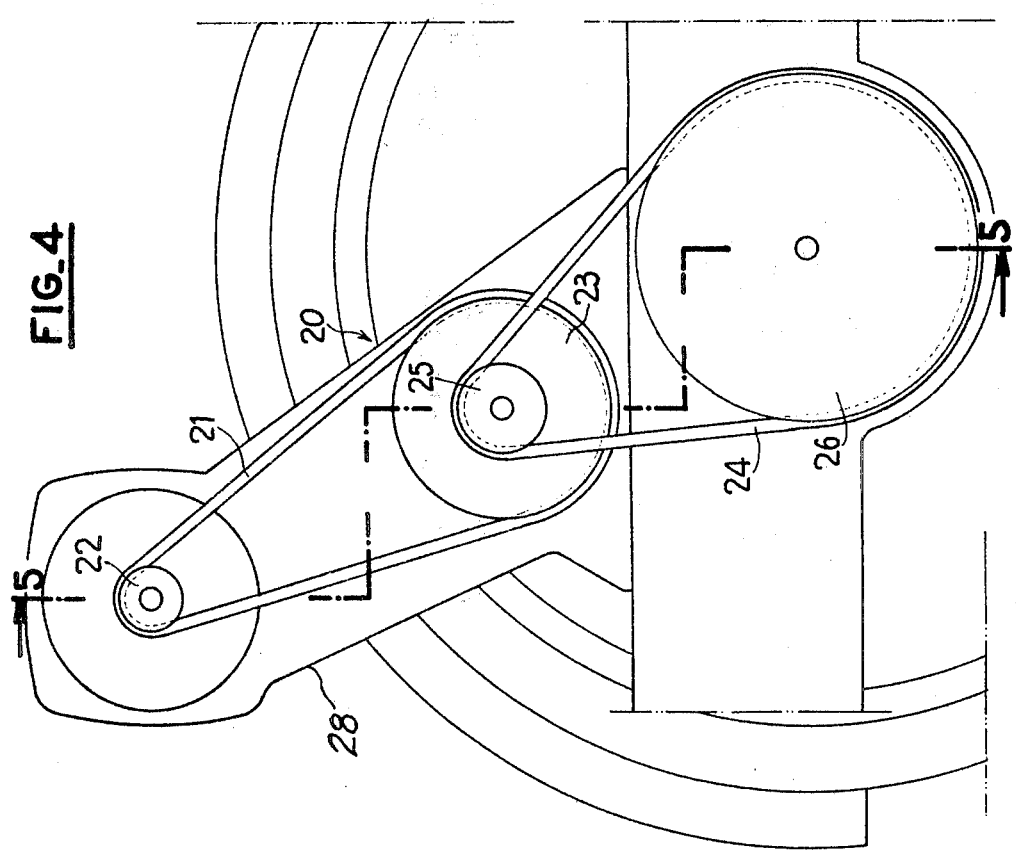

The invention will be described in more detail hereinafter with reference to the accompanying drawing in which:

FIG. 1 is a diagrammatic side elevational view of a vehicle arranged in accordance with the invention;

FIGS. 2 and 3 are respectively sectional views taken on lines 2—2 and 3—3 of FIG. 1, some of the parts having been removed for reasons of clarity;

FIG. 4 is a side elevational view of a modification of the transmission between the motor and the rear wheel, and, FIG. 5 is a sectional view taken on line 5—5 of FIG. 4.

FIGS. 1 to 3 show a two-wheeled vehicle arranged in accordance with the invention. This vehicle mainly comprises a frame 1 constructed in any suitable way, for example from metal tubes. This frame carries, on each side of its center part and of its rear fork, 2 boxes or compartments 3a, 3b, 4a, 4b which are closed in their upper part by a lid 5 in one or more parts and which receive accumulator batteries for supplying current to an electric motor. In the illustrated embodiment, four compartments are provided, namely two compartments 3a, 3b disposed in the center part of the vehicle on each side of the frame and two other compartments 4a, 4b disposed on each side of the rear driving wheel of the vehicle. The two last-mentioned compartments may extend substantially beyond the axis of the rear wheel as shown in FIG. 1.

Each of these compartments receives a battery or a series of accumulator batteries 6a, 6b, 6c, 6d which have a relatively small height (for example of the order of 10 cm) so as to avoid taking up an excessive amount of space, in particular in the center part of the vehicle.

Defined between the two compartments 3a, 3b disposed in said center part of the vehicle is a space 7 which may receive a cable 8, a battery charger 9 or any other useful accessory. This space is also closed by the lid 5.

A pedal crank-gear 10 is disposed in such manner that its shaft 11 extends between the pairs of front and rear compartments. This crank-gear drives the rear wheel in the conventional manner through a transmission chain 12.

Note that in the illustrated embodiment a slight step 13 exists between the front and rear compartments so as to lower the center of gravity and also lower the plane on which the feet of the passenger bear. The appearance of the vehicle is also improved in this way. Further, the front compartments 3a, 3b are preferably oriented in an oblique manner so as to converge toward the front of the vehicle (FIG. 2).

The electric motor 14 is disposed below and at the rear of the saddle 15. In the embodiment shown in FIGS. 1 to 3, the transmission between the motor and the rear wheel 16 is provided by a friction roller 17 which is in contact with the tire and is driven by a toothed belt transmission 18 or a chain. The roller may be disengaged in the known manner from the tire if required.

In the embodiment shown in FIGS. 4 and 5, this transmission is provided by a gearing-down device 20 comprising two chain or belt transmissions in series, eg. having respectively a first belt 21 extending around two pulleys 22, 23 and a second belt 24 extending around pulleys 25, 26, the two intermediate or relay pulleys 23, 25 being keyed on the same shaft. This device is received in a housing 28 and has a very small overall size.

There is no need to describe the operation of such a vehicle. On the other hand, it is well to mention the advantages it has over electrically propelled conventional vehicles:

the original arrangement of the accumulator batteries is particularly advantageous since the fact of providing some of these batteries on each side of the rear wheel reduces the overall size of the series of batteries in the center part of the vehicle, in particular in height, while the vehicle has the same or even greater autonomy in respect of the duration of the charge of the batteries; consequently, the space available for the feet and legs of the user is substantially increased and the stability of the vehicle improved; the vehicle is moreover lighter in appearance and consequently better looking;

the fact of providing front and rear compartments for these batteries enables the axis of rotation of the pedal crank-gear to be disposed in the gap between the two compartments, which is also most advantageous;

the fact of providing in the center part of the vehicle a compartment on each side of the frame provides a free space for receiving accessories which are usually difficult to house;

the placement of the motor is also advantageous since it results in a free space below and in front of the saddle as opposed to the situation in conventional vehicles.

Having now described my invention what I claim as new and desire to secure by Letters Patent is:

1. In an electrically propelled vehicle comprising a front wheel, a rear wheel, a frame, electric accumulator batteries and a saddle carried by said frame, a motor connected to said batteries so as to be supplied with current from said batteries, and transmission means between the motor and the driving wheel; the improvement wherein said batteries comprise two batteries disposed in a center part of the vehicle substantially symmetrically on each side of a longitudinal median plane of the vehicle and two batteries disposed in a rear part of the vehicle on each side of said rear wheel, the batteries in the center part of the vehicle being substantially in alignment with the batteries in the rear part of the vehicle in plan and having rear ends in close proximity to front ends of the batteries in the rear part of the vehicle.

2. In an electrically propelled vehicle comprising a front wheel, a rear wheel, a frame, electric accumulator batteries and a saddle carried by said frame, a motor connected to said batteries so as to be supplied with current from said batteries, and transmission means between the motor and the driving wheel; the improvement wherein said batteries comprise two batteries which are disposed in a center part of the vehicle substantially symmetrically on each side of a longitudinal median plane of the vehicle and define therebetween a space for receiving various accessories and two batteries disposed in a rear part of the vehicle on each side of said rear wheel.

3. A vehicle according to claim 1, wherein the batteries have a height which is less than one half of the radius of the wheels.

4. A vehicle according to claim 1, 2 or 3, comprising front and rear compartments for the batteries and lid means for closing said compartments in an upper part of said compartments.

5. A vehicle according to claim 4, comprising a step between the front and rear compartments, the front compartments being at a lower level than the rear compartments.

6. A vehicle according to claim 4, wherein the front compartments are oriented slightly obliquely and converge toward the front of the vehicle.

7. A vehicle according to any one of the claims 1 to 3, comprising a pedal crank-gear having a shaft which extends in an intermediate region between the batteries which are disposed respectively in the center part of the vehicle and on each side of the rear wheel.

8. A vehicle according to any one of the claims 1 to 3, wherein the motor is disposed below and at the rear of said saddle.

9. A vehicle according to claim 8, wherein said rear wheel has a tire and said transmission means comprise a friction roller in contact with said tire and an endless flexible transmission element drivingly connecting said motor to said roller.

10. A vehicle according to claim 8, wherein said transmission means comprise a gearing-down device comprising two endless flexible transmission elements arranged in series, a pair of wheels around which pair of wheels a first of said transmission elements extends and a second pair of wheels around which second pair of wheels a second of said transmission elements extends, a wheel of each of said pairs of wheels constituting intermediate wheels and being keyed on a common shaft.

11. A vehicle according to claim 1, wherein said batteries are disposed horizontally and a horizontal plane containing axes of rotation of said wheels constitutes substantially a median plane of the batteries in the center part of the vehicle, and passes through the batteries in the rear part of the vehicle, a footrest for the driver of the vehicle being positioned above the batteries in the center part of the vehicle.

* * * * *